United States Patent
Baranyay et al.

(10) Patent No.: US 12,213,461 B2
(45) Date of Patent: Feb. 4, 2025

(54) APPARATUS FOR THE CONTROLLED DISPENSING OF A FEED SUPPLEMENT HYDROGEL WITH HIGH VISCOSITY

(71) Applicants: Henrik Baranyay, Nagykovácsi (HU); Csanád Simon, Nagykovácsi (HU); Péter Toldi, Biatorbágy (HU); János Molnár, Budapest (HU)

(72) Inventors: Henrik Baranyay, Nagykovácsi (HU); Csanád Simon, Nagykovácsi (HU); Péter Toldi, Biatorbágy (HU); János Molnár, Budapest (HU)

( * ) Notice: Subject to any disclaimer, the term of this patent is extended or adjusted under 35 U.S.C. 154(b) by 119 days.

(21) Appl. No.: 17/779,556

(22) PCT Filed: Nov. 25, 2020

(86) PCT No.: PCT/HU2020/050055
§ 371 (c)(1),
(2) Date: May 25, 2022

(87) PCT Pub. No.: WO2021/105731
PCT Pub. Date: Jun. 3, 2021

(65) Prior Publication Data
US 2023/0021847 A1    Jan. 26, 2023

(30) Foreign Application Priority Data
Nov. 25, 2019 (HU) .................................. P1900395

(51) Int. Cl.
*A01K 5/02* (2006.01)
*A61D 7/00* (2006.01)

(52) U.S. Cl.
CPC .......... *A01K 5/0216* (2013.01); *A01K 5/0275* (2013.01); *A61D 7/00* (2013.01)

(58) Field of Classification Search
CPC .. A01K 5/0216; A01K 5/0275; A01K 13/003; A01K 45/00; A01K 7/02;
(Continued)

(56) References Cited

U.S. PATENT DOCUMENTS 5,464,121 A * 11/1995 Jones ..................... B01L 3/0293
137/115.26
6,110,455 A     8/2000 Hargis et al.
(Continued)

FOREIGN PATENT DOCUMENTS

| EP | 3 434 224 A1 | 1/2019 |
|---|---|---|
| WO | WO2005099617 A1 | 10/2005 |
| WO | WO2006081316 A2 | 8/2006 |

OTHER PUBLICATIONS

HatchGel SP https://www.biochem.net/en/product-lines/farm-concepts/poultry/hatchgel-sp.html?dlang=1.

(Continued)

*Primary Examiner* — Bob Zadeh

(57) ABSTRACT

The present invention relates to a dispensing apparatus for the controlled dispensing of a high viscosity feed supplement hydrogel, which has a fluid container (A), a diaphragm pump (1), a fluid box (B) in which dispensing nozzles (6) are arranged.
The invention is characterized in that within the fluid box (B) it has a pressure regulator (2), one or more pneumatic dispensing valves (3) associated with the pressure regulator (2), and a fluid distributor (5) connected to the lower outlet openings of each pneumatic dispensing valve (3), wherein to each fluid distributor (5) one or more dispensing nozzle(s) (6) are arranged orderly in several rows, a solenoid valve (4) is connected to an upper outlet connector of the pneumatic dispensing valve (3), an outlet of an air pressure regulator (8) is connected to one of the inlets of the solenoid valve (4) and an outlet of a control box (C) is electronically connected (Continued)

to another inlet of the solenoid valve (4), which control box (C) can also be operated via WIFI by a remote control (9), another outlet of the air pressure regulator (8) is connected to an inlet of the diaphragm pump (1), an optical sensor (7) is arranged in the fluid box (B) for optimal control of the dispensing nozzles (6), an outlet of the optical sensor (7) is connected to one of the inlets of the control box (C).

5 Claims, 2 Drawing Sheets

(58) Field of Classification Search
CPC . A01K 5/02; A01K 39/00; A61D 7/00; A61D 1/025
See application file for complete search history.

(56) References Cited

U.S. PATENT DOCUMENTS

| | | | | |
|---|---|---|---|---|
| 2006/0231341 A1* | 10/2006 | Wech | ............... | F16N 17/04 |
| | | | | 184/6.22 |
| 2012/0174872 A1* | 7/2012 | Richards | ............. | A01K 13/003 |
| | | | | 119/665 |
| 2013/0292407 A1* | 11/2013 | Beavis | ............... | F04B 13/00 |
| | | | | 222/23 |
| 2016/0278899 A1* | 9/2016 | Heller | ............... | A61K 31/198 |
| 2017/0190566 A1* | 7/2017 | Cramm | ............... | B67D 7/0294 |
| 2017/0209250 A1* | 7/2017 | Palmer | ............... | A61D 7/00 |
| 2017/0360540 A1* | 12/2017 | Jackwood | ............. | A61D 1/025 |
| 2020/0170769 A1* | 6/2020 | Petri | ............... | A01K 45/00 |
| 2023/0021847 A1* | 1/2023 | Baranyay | ............. | A01K 5/0216 |

OTHER PUBLICATIONS

Desvac gel dispenser https://thepoultrysite.com/focus/ceva/ceva-desvac-gel-dispenser.
Gel-Pac https://www.asp-inc.com/international-hatchery-practice/.
Clear H2O https://www.clearh2o.com/shop/agricultural-products/.
Control and automation of spraying machines, Huszár Jenö, Dr. Pályi Béla https://mezohir.hu/2019/06/05/permetezogepek-szabalyzasa-automatikai.

* cited by examiner

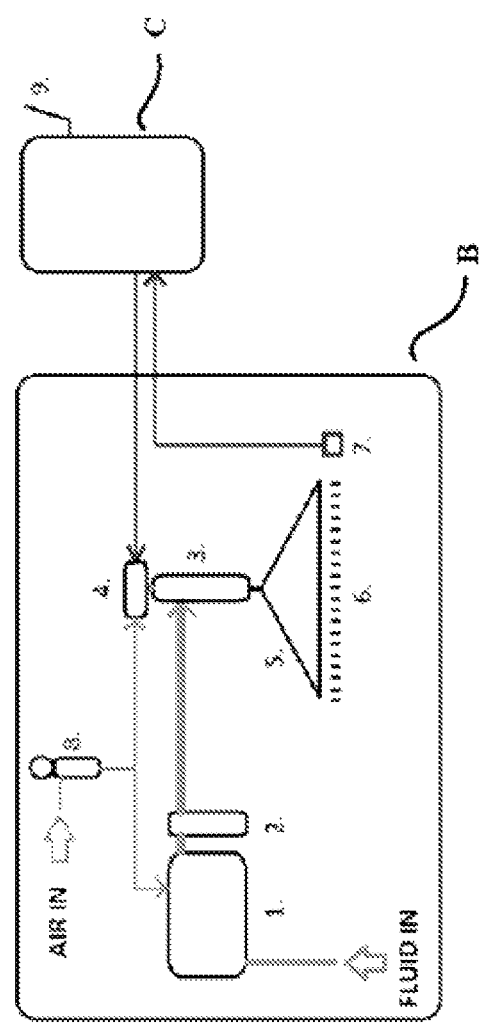

APPARATUS FOR THE CONTROLLED DISPENSING OF A FEED SUPPLEMENT HYDROGEL WITH HIGH VISCOSITY

The present invention relates to a dispensing apparatus suitable for the controlled dispensing of a high viscosity feed supplement product (superabsorbent hydrogel), which apparatus can be used to automatically control the shape, size and size distribution of drops, so that each animal always obtains the optimal amount of vaccine, pre- and probiotic, food, water, etc.

The hydrogel itself is an innovative new product that complies with EU feed additive law EC 1831/2003 and animal welfare standards, which can, among other things, increase the survival rate of poultry during transport and hatching. The product is a natural polymer-based hydrogel that can be prepared in two different forms, both as a physical and a chemical gel. The chemical gel differs from the physical gel in that, in the case of the chemical gel, first-order bonds form the three-dimensional network, in the physical gel, loops between the polymer chains, chain entanglement, and second-order bonds form the (physical) network.

Due to their different structures, the two gels have very different rheological properties. Besides, their rheological behavior is also very different from the rheological behavior of ideal materials. They are non-Newtonian fluids, but pseudoplastic materials, i.e. their viscosity also depends on the shear conditions (geometry, shear stress, shear rate), which further makes it difficult to ensure proper dispensing.

Devices for the dispensing of similar gels are known which consist of a frame, a container, a suction device and a dosing head (nozzle or a simple tube end).

Products of the following manufacturers are known in the market who manufacture these types of products. Based on an internet search, we have found the following information.

- Bionim (https://www.biomin.net/hu/sajtokoezlemenyek/a-biomin-bemutatja-a-poultrystarr-hatchery-szinbiotikus-gel-cseppet-naposcsibek-szamara/)
- Biochem (https://www.biochem.net/en/product-lines/farm-concepts/poultry/hatchgel-sp.html?dlang=1)
- Desvac gel dispenser (https://thepoultrysite.com/focus/ceva/ceva-desvac-gel-dispenser)
- Animal Science Products® (https://www.asp-inc.com/international-hatchery-practice/): here, too, it is an evenly distributed gel, a short video also shows the application and that the active ingredients are evenly distributed in the gel: https://www.youtube.com/watch?v=gB_kisE8Ac4
- Ceva Desvac gel dispenser (https://thepoultrysite.com/focus/ceva/ceva-desvac-gel-dispenser: it includes even dosing, precise drop size, even flow rate, reliable air pressure regulator and flow regulator valve, smart system to indicate empty tanks and jammed cages, user-friendly design.
- ClearH2O® (https://www.clearh2o.com/shop/agricultural-products/): the gel drops are characterized by high surface tension, and the volume of the gel drops can be adjusted with the help of the dosing applicator.

A disadvantage of the known devices is that the shape, size and size distribution of the drops cannot be properly controlled. The geometry of the drops is determined by the physical and chemical properties of the material used, which can be a gel (physical or chemical), a viscous solution, a suspension or an emulsion. That is, the shape and size of the drop depends, among other things, on the surface tension of the material, the viscosity, the temperature, the pressure under the particular shear conditions, and the concentration of the solution/emulsion/suspension/gel.

This poses a problem because it is very important, especially for vaccines, but also for other early feed supplements, that each animal could get the same amount of vaccines, pre- and probiotics, food, water, and so on. Animals should receive optimal amounts of these substances, not allowing one to receive more and the other to receive less. If one obtains less, we will not achieve the desired goal, which in the case of vital substances can also lead to the death of the animal. In turn, if an animal gets more, it can harm the animal in the same way, and from an economic point of view, it is wasting to give the animal more than the optimal amount of food, active ingredients, etc.

A further disadvantage of these devices is that the values of the individual operating parameters cannot be set numerically and thus cannot be optimized. Consequently, its control and control technique cannot be solved in such a way that the dosing is reproducible. Moreover, when using such equipment, switching between different feed supplements is time consuming and requires prior experience and expertise.

Our aim with the development of the dispensing apparatus according to the invention was to be able to dose such a rheological system accurately, to control the shape, size and size distribution of the drops appropriately and automatically so that each animal always has the optimal amount of vaccine, pre- and probiotic, food. for water, etc. Animals should always get the optimal amount of these substances.

Our further aim was to be able to numerically adjust the value of each operating parameter and thus optimize it, so that even remote control and control technology can be attained in a way that dosing could simple and reproducible, without necessarily requiring serious prior experience and expertise.

It was also an objective to shorten the switching time between different feed supplements.

Another goal was to achieve a uniform pressure, shear profile and geometry with a special fluid distribution device.

In the course of the realization of the present invention, it has been found that in the known solutions, and without the special fluid distribution component, since the nozzles are located in different places, the length of the flow path and the flow geometry will be different. It follows that a different pressure and shear profile develops in front of the dosing heads, which, due to the fact that it is a pseudoplastic material, will cause different viscosities and resistance to flow. As a result, the flowability of the material will be different for different nozzles, resulting in drops not forming the same size as the nozzles, and the frequency of drop formation will be different, which prevents uniform dosing.

We have realized that efficient and accurate dispensing can be achieved if the drops are shaped by ourselves by creating the right geometry and pressure conditions. Prior art apparatuses are not capable of attaining this because the shape, size and size distribution of the drops are determined by the dosing rate and the properties of the material, thereby they cannot be properly controlled neither can the dosing be optimized. The consequence of all this is that the size of the drops varies over a very wide range, as they are form drops due to their own inertia.

The realisation was that if we use a suitable pump, nozzles, control technology with numerically adjustable parameters and a new, self-developed flow fluid distribution subassembly (equiflow), then we can attain reproducibility, automatic control, remote control according to our goal, i.e. an apparatus suitable for the criteria, which guarantees a high level of quality assurance and convenience in the controlled dispensing of high viscosity gel systems. With this solution, it is possible that since one piece of fluid distributor distributes the dispensed fluid to eight nozzles, all eight nozzles receive the same amount of dispensed fluid.

The invention therefore relates to a dispensing apparatus or arrangement for the controlled dispensing of a high viscosity feed supplement hydrogel, which has an fluid A container, a diaphragm 1 pump, a fluid B box in which dispensing 6 nozzles are arranged.

The invention is characterized in that within the fluid B box it has a pressure 2 regulator, one or more, preferably 1-15 pieces of pneumatic dispensing 3 valves associated therewith, and a fluid 5 distributor connected to the lower outlet openings of each pneumatic dispensing valve, wherein to each fluid distributor one or more, preferably one-nine pieces of dispensing nozzle(s) are arranged orderly in several rows, a solenoid 4 valve is connected to an upper outlet connector of the pneumatic dispensing 3 valve, an outlet of an air pressure 8 regulator is connected to one of the inlets of the solenoid valve and an outlet of a control C box is electronically connected to another inlet of the solenoid valve, which control C box can also be operated via WiFi by a remote 9 control, another outlet of the air pressure 8 regulator is connected to an inlet of the diaphragm 1 pump, an optical 7 sensor is arranged in the fluid B box for optimal control of the dispensing 6 nozzles, an outlet of the optical sensor is connected to one of the inlets of the control C box.

The embodiments of the present invention are described in the dependent claims.

The apparatus of the present invention is shown in FIGS. 1 and 2 and the operation of its units is described below.

BRIEF DESCRIPTION OF THE DRAWINGS

FIG. 2 shows a sketch plan of the fluid box with its units, and the control box of the present invention FIG. 1 shows a schematic view of the apparatus with its units, which are the following:

Figure 1:
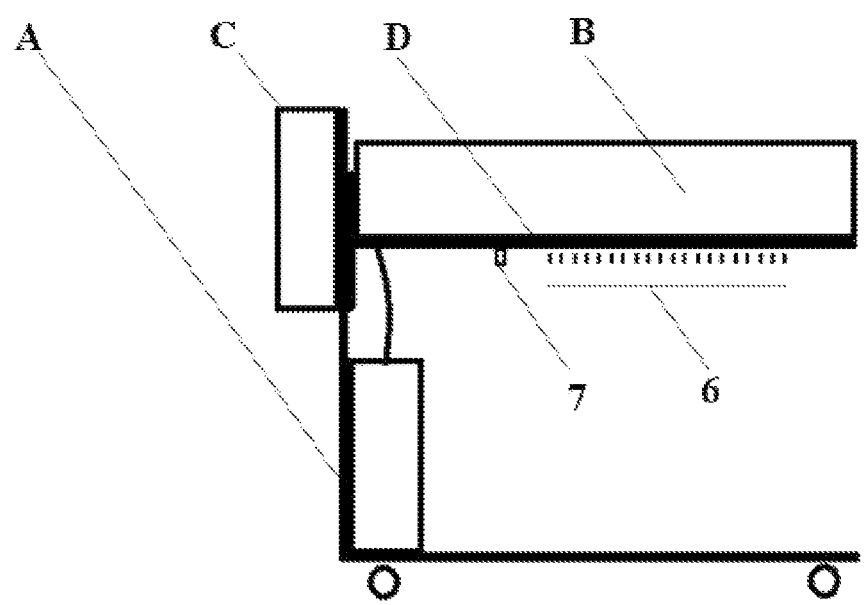
FIG. 1 shows a schematic view of the apparatus of the present invention.

The fluid A container is in connection with fluid B box, in which the dispensing 6 nozzles and the optical 7 sensor monitoring them are placed on a D stand, an inlet of the 7 sensor is connected to one of the outlets of the control C box.

The fluid B box, which can be seen on FIG. 2 and the units formed therein, such as the diaphragm 1 pump, which conveys the fluid through the pressure 2 regulator to the pneumatic dispensing 3 valve, which on the one hand is in electronic communication with the solenoid 4 valve and its lower outlet is connected to a fluid 5 distributor, which conveys the fluid onto the dispensing 6 nozzles.

The air pressure in the fluid B box is regulated by an air pressure 8 regulator, the outlet of which is connected to one of the inlets of the diaphragm 1 pump and to the other inlet of the solenoid 4 valve. This is accomplished by process control with remote 9 control and via a WiFi modem it can as well be operated from a telephone. The operation of the apparatus is fully automatic after switching it on and setting it. The diaphragm 1 pump of the apparatus automatically absorbs the fluid or gel to be dispensed. The absorbed material is dispensed in a pre-set amount and drop size, in a selectable width—400 mm or 600 mm—in an even geometric and quantitative distribution over the area of the cage passing underneath.

The apparatus detects the passing of the crate by means of the optical 7 sensor and activates the dispensing with a delay corresponding to the belt speed. The set dispensing parameters are numerical and can be included in a technological instruction. The set parameter operation is 100% reproducible, so the apparatus can meet the strictest quality assurance requirements.

The setting and control of the apparatus can also be accomplished from a remote PC or mobile phone via the built-in WiFi modem. A separate washing program is available to flush the fluid system of the apparatus, which provides efficient cleaning and disinfection throughout the entire fluid system by alternating continuous and pulsating flow.

The numerically adjustable dispensing parameters are as follows:
drop size
amount/density of drops in the scatterplot
dispensing width: 400 mm or 600 mm—in accordance with the typical cage sizes.
delay/conveyor belt speed The functions of the units are as follows:
Pneumatic dispensing 3 valve: dispensing of the fluid with adjustable control parameters.
Diaphragm 1 pump: suction and transfer of the fluid to the pneumatic dosing 3 valve.
Fluid 5 distributor: even flow distribution of the fluid to the dispensing 6 nozzles.
Dispensing 6 nozzles: drop formation and separation from the fluid system.
Optical 7 sensor: synchronizing the operation of the dispensing system with the user's conveyor.
Control C box: PLC control, coordination of the entire operation of the dispensing system, as well as ensuring that the operation of the system can be adjusted as expected, far-reaching fulfilment of quality assurance requirements by ensuring precise, reproducible operation in accordance with the set parameters.
Touch screen: tool for user-friendly, numerical setting of the dispensing parameters.
Remote 9 control: ensuring remote control and adjustment of the dispensing system via a WiFi modem with remote access.

None of the components have been used in this application of the invention. The system configuration created by us in the apparatus is our own development. So is the system operating program.

The technical advantages of the invention are described below: it is capable of dispensing viscous materials, gels (pseudoplastic materials) so that
the drop size can precisely be adjusted and controlled
the parameter setting is made numerically thereby reproducible dispensing is achievable
the same drop size and size distribution for the dispensing heads of different arrangement
numerical parameters allow remote monitoring, control, intervention.

The economic advantages of the invention are as follows:
enables a high level of quality assurance
allows optimal and even administration of nutrients, vaccines and other substances, such as antibiotics, to animals, which guarantees:
better weight gain
resistance to stronger pathogens
reduction of the risk of dehydration
more economical fattening
lower mortality
maximum genetic performance for poultry.

Expected fields of application of the invention: poultry industry hatcheries, poultry integrations, feed industry.

What is claimed is:

1. A dispensing apparatus for controlled dispensing of a high viscosity feed supplement hydrogel, wherein the dispensing apparatus comprises a fluid container, a diaphragm pump, a fluid box in which dispensing nozzles are arranged, wherein the fluid box comprises of a pressure regulator, one or more pneumatic dispensing valves associated with the pressure regulator, a fluid distributor connected to lower outlet openings of each pneumatic dispensing valve, wherein to each fluid distributor one or more dispensing nozzle(s) are arranged orderly in several rows a solenoid valve is connected to an upper outlet connector of the pneumatic dispensing valve, an outlet of an air pressure regulator is connected to one of first inlets of the solenoid valve and an outlet of a control box is electronically connected to another inlet of the solenoid valve, wherein the control box is operable by a remote control via WIFI, another outlet of the air pressure regulator is connected to an inlet of the diaphragm pump, an optical sensor is arranged in the fluid box for optimal control of the dispensing nozzles, an outlet of the optical sensor is connected to one of second inlets of the control box.

2. The apparatus according to claim 1, wherein nine pieces of the pneumatic dispensing valves are built in series in the fluid box for a working width of 600 mm, and the fluid distributor is formed after each pneumatic dispensing valve, and eight pieces of the dispensing nozzles are connected to each fluid distributor.

3. The apparatus according to claim 1, wherein the dispensing nozzles are arranged in two rows at a distance of 15 mm from one another, and in each row thirty-six of the dispensing nozzles are arranged.

4. The apparatus according to claim 1, wherein for a working width of 400 mm, two times forty-eight of the dispensing nozzles are arranged.

5. The apparatus according to claim 1, wherein the dispensing apparatus is mounted on a bracket.

* * * * *